United States Patent
Weinert et al.

(10) Patent No.: US 7,079,745 B1
(45) Date of Patent: Jul. 18, 2006

(54) SPOOL ASSEMBLY FOR ABSORBING SLACK OF FIBER OPTIC JUMPERS ROUTED THROUGH RACEWAYS AND NETWORK EQUIPMENT

(75) Inventors: Stephen J. Weinert, Arlington, TX (US); Michael L. Yeilding, Fremont, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 18 days.

(21) Appl. No.: 11/057,451

(22) Filed: Feb. 14, 2005

(51) Int. Cl.
*G02B 6/00* (2006.01)
(52) U.S. Cl. .................. 385/135; 385/134; 385/147
(58) Field of Classification Search ............... 385/135, 385/134, 147
See application file for complete search history.

(56) References Cited

U.S. PATENT DOCUMENTS

| | | | |
|---|---|---|---|
| 5,402,515 A | | 3/1995 | Vidacovich et al. |
| 5,758,002 A | * | 5/1998 | Walters ................ 385/134 |
| 5,946,440 A | | 8/1999 | Puetz |
| 6,349,893 B1 | | 2/2002 | Daoud |
| 6,571,047 B1 | | 5/2003 | Yarkosky et al. |
| 6,614,978 B1 | | 9/2003 | Caveney |
| 6,625,374 B1 | | 9/2003 | Holman et al. |
| 6,643,445 B1 | * | 11/2003 | Bumgarner et al. ........ 385/137 |
| 6,650,821 B1 | * | 11/2003 | Koyano et al. ............ 385/136 |
| 2004/0094491 A1 | | 5/2004 | Smith et al. |

* cited by examiner

*Primary Examiner*—Sung Pak
*Assistant Examiner*—James D. Stein
(74) *Attorney, Agent, or Firm*—Brooks Kushman P.C.

(57) ABSTRACT

A fiber optics system includes a relay rack having network equipment bays inserted therein. A raceway extends over the relay rack for routing fiber optic jumpers to the bays. A spool assembly for absorbing and storing slack or excess length of the jumpers is selectively incorporated in the system. The spool assembly includes a cylindrical spool supported on a mount having an adhesive surface. The adhesive surface attaches to the relay rack in order to attach the spool to the relay rack such that the spool is positioned adjacent to the bays in order to store the slack of jumpers connected between the raceway and the bays upon the jumpers being wrapped over or around the spool. The spool has a radius larger than a minimum bend radius of the jumpers such that the jumpers are not bent beyond the minimum bend radius when wrapped over or around the spool.

14 Claims, 5 Drawing Sheets

SPOOL ASSEMBLY FOR ABSORBING SLACK OF FIBER OPTIC JUMPERS ROUTED THROUGH RACEWAYS AND NETWORK EQUIPMENT

BACKGROUND OF THE INVENTION

1. Field of the Invention

The present invention relates to mechanisms for routing, supporting, and storing fiber optic jumpers.

2. Background Art

Fiber optic troughs carry and route cables such as fiber optic jumpers. Certain troughs called "raceways" horizontally extend over network equipment such as fiber distributing frames and bays which make up a fiber optics environment. The raceways are similar in design to rain gutters. Jumpers placed inside the raceways run along the raceways from point-to-point. Jumpers exit the raceways through exit troughs to connect with the network equipment.

Network equipment includes electronic shelving mounted into relay racks. Such relay racks are also known as bay frameworks and equipment bays. The jumpers exiting from a raceway typically run vertically down the sides of the relay rack to connect with the network equipment. Such jumpers may also run vertically down through a duct located inside the relay rack to connect with the network equipment. The relay rack sides and the duct represent standard vertical trough systems. Such standard vertical trough systems allow jumper access in/out of the equipment bays but do not take jumper bend radius control or jumper slack management into consideration.

Jumper bend radius control is important as jumpers should not be bent beyond a minimum curvature radius of 1.5 inches in order to ensure their proper signal transmission characteristics. Jumper slack management control is important, as the actual length of jumpers routed through raceways and network equipment in a fiber optics environment is usually much greater than the length physically required for the jumpers to be connected between termination points in the fiber optics environment.

As a result of the deficiencies associated with the standard vertical trough systems, relay racks have been augmented on their sides with costly trough systems having bend radius limiters. Such a trough system generally includes a metal trough that is a part of (or attached to) a relay rack and runs vertically along the relay rack. The bend radius limiters fit in certain limited areas relative to the relay rack based upon constraints of the metal trough. In addition, once the metal trough is in place the metal trough and the bend radius limiters do not have the flexibility to adapt to the changing needs of a fiber optics environment.

It is recognized that jumpers should have an extra length (commonly known as "slack") than the length actually required for being connected to termination points in a fiber optics environment for two reasons. First, the extra length enables jumpers to have a loose fit and therefore be able to slide over one another without hindrance. Second, the extra length enables jumpers to transmit optical signals correctly by not reducing the length of the jumpers so that the actual wavelength distance (generally considered at five feet) between connectors remains consistent.

As such, there is a need to store jumper slack next to network equipment including relay racks or within fiber distribution frames. A fiber distribution frame is made up of relay racks linked together by a horizontal and vertical trough system. Both relay racks and fiber distribution frames require jumper slack and jumper bend radius management.

DETAILED DESCRIPTION OF THE PREFERRED EMBODIMENT(S)

Figure 1:
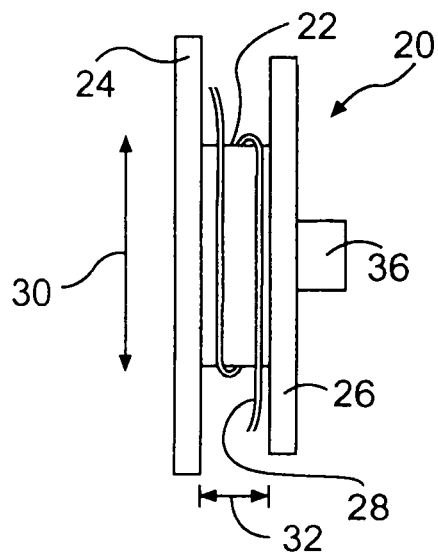
FIG. 1 illustrates a side view of a spool assembly having a jumper spool for absorbing fiber optic jumper slack in accordance with an embodiment of the present invention in which the jumper spool is in a non-telescoped layout.

Jumper spools for absorbing and storing slack of fiber optic jumpers routed through raceways and network equipment in accordance with the present invention have many advantages. In general, the jumper spools augment existing relay rack (bay) trough openings (either vertically or horizontally) within the trough openings. The jumper spools are adhered to the inside of the troughs with the use of adhesive and placed at strategic points within the troughs to secure the jumpers and store slack associated with the jumpers. The jumper spools absorb the jumper slack as a result of the jumpers being wrapped around or over the jumper spools. The jumper spools provide for the minimum jumper bend radius of 1.5 inches (3.0 inches diameter) for the jumpers wrapped over or around the jumper spools.

The jumper spools provision the security, protection, and containment of jumpers on the side of each bay relay rack or on the bay equipment itself on an extremely cost effective basis. The jumper spools are flexible in their use, placement, and ability to adapt as compared with typical jumper limiters.

The jumper spools in accordance with other embodiments of the present invention have a telescoping feature. The telescoping feature is activated by pressing a spring button on the exterior facing of the jumper spool. The jumper spool expands to its largest thickness (such as three inches) away from a structure (such as a relay rack) to which it is adhered. With successive touches on the spring button, the thickness of the jumper spool reduces in ½ inch increments down to its minimum thickness (such as one inch). The use of the telescoping feature permits a rapid customization of a jumper spool to a bay and restrains the jumpers in a loose containment field while permitting the jumpers to slide in relation to one another.

The jumper spools contain and protect jumpers in existing trough subsystems without the requirement to place new troughs. The jumper spools are configurable in one, two, and higher multiple jumper limiter spool varieties. The multiple jumper spool varieties rapidly absorb excess jumper lengths (i.e., slack) of jumpers placed in troughs without mitigating the minimum bend radius by wrapping the jumpers in "figure eight" arrangements between two or more jumper spools.

The jumper spools accommodate easy installation. In the past, time and effort spent to place fasteners and spools was complicated, complex, and limited by the construction of metal troughs that are a part of (or attached to) a relay rack. The jumper spools use existing relay rack storage without further complex modifications and simplify the adaptation process. Wherever the jumper spools fit, the jumper spools can be used and attached. As such, by using a telecommunications adhesive, the jumper spool (i.e., jumper spool radius limiters) can be placed at will.

The cost factor of the jumper spools is a dramatic paradigm shift in and of itself. The jumper spools attach to a structure such as a relay rack, rack equipment, or trough from their rear using a stick-on adhesive. As such, the jumper spools have the ability to adapt, modify, and protect jumpers while at the same time not compromising the integrity of the minimum bend radius necessary for the provisioning of fiber optic service.

As such, advantages of the jumper spools include being cheaper, better, faster, and more easily adaptive. The jumper spools trigger a new paradigm shift on service provisioning of jumpers for slack management, containment, and protection.

A summary of the advantages of the jumper spools is as follows. The jumper spools do not require fixed locations for radius guides. The jumper spools use stick-on adhesive to attach to structures such as the sides of a relay rack without screws or other such hardware. The jumper spools protect and maintain the bend radius of the jumpers. The radius guides of multiple jumper spools are configurable to be used in tandem exclusively for jumper wrapping. The jumper spools provide discrete storage for excess wrapping of jumpers. The jumper spools adhere to network equipment as indicated above and, as such, are easily replaceable and movable. The telescoping functionality of the jumper spools permits jumper storage capacity expansion. The jumper spools can be easily installed or rearranged.

The jumper spools have a lower cost compared with glide assemblies or standard vertical troughs. Further, neither the glide assemblies nor the standard vertical troughs provide any of the jumper spool advantages summarized above.

Referring now to FIG. 1, a side view of a spool assembly 20 for absorbing fiber optic jumper slack in accordance with an embodiment of the present invention is shown. Spool assembly 20 generally includes a jumper spool 22 supported between a bottom mounting portion 24 and a top facing portion 26. Fiber optic jumpers 28 wrap around or over jumper spool 22 in order for the jumper spool to store and absorb slack associated with the jumpers. Jumpers 28 include one jumper which wraps around or over jumper spool 22 and also include separate and different jumpers which wrap around or over the jumper spool.

Jumper spool 22 generally has a cylindrical body structure with a diameter 30. Diameter 30 is large enough to ensure that jumpers 28 wrapped around or over jumper spool 22 maintain a minimum bend radius. Preferably, diameter 30 is at least 3.0 inches to accommodate the standard minimum jumper bend radius of 1.5 inches. As such, jumpers 28 are not bent past the minimum bend radius when wrapped around or over jumper spool 22.

The cylindrical body structure of jumper spool 22 has a width 32 between bottom mount 24 and top face 26. The size of width 32 determines the jumper volume storable by jumper spool 22. That is, the size of width 32 determines the number of times that jumpers 28 are able to wrap around or over jumper spool 22 while being wrapped in a loose containment field that permits the jumpers the ability to slide in relation to one another.

Bottom mount 24 and top face 26 also have cylindrical body structures. The widths of bottom mount 24 and top face 26 are relatively smaller than the width of jumper spool 22 as the bottom mount and the top face function as covers for the jumper spool. The diameters of bottom mount 24 and top face 26 are relatively larger than diameter 30 of jumper spool 22 in order to prevent jumpers 28 wrapped around or over the jumper spool from inadvertently slipping away from the jumper spool.

In accordance with the present invention, jumper spool 22 has a telescoping feature which enables the width of jumper spool 22 to be changed. The telescoping feature enables the width of jumper spool 22 to be enlarged (or contracted) in order to increase (decrease) the jumper volume storable by the jumper spool. FIG. 1 illustrates jumper spool 22 in a non-telescoped layout. In the non-telescoped layout, jumper spool 22 has a minimum width which is set at width 32 as shown in FIG. 1.

The cylindrical body structure of jumper spool 22 is configured to include multiple body layers which are interconnected and overlap one another to enable the telescoping feature and to accommodate for increases in the width of jumper spool 22 between bottom mount 24 and top face 26. The multiple body layers expand out from one another to increase the width of jumper spool 22. FIG. 1 illustrates the situation in which the multiple layers of the cylindrical body structure of jumper spool 22 are contracted over one another such that the jumper spool has minimum width 32.

Figure 2:
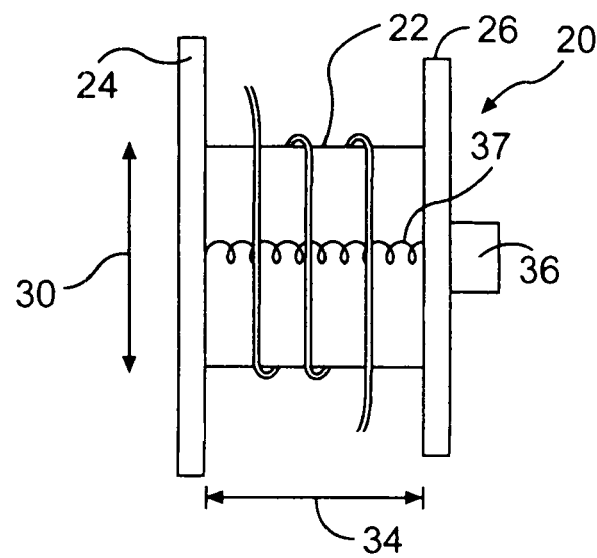
FIG. 2 illustrates a side view of the spool assembly shown in FIG. 1 in which the jumper spool is in a telescoped layout.

Referring now to FIG. 2, with continual reference to FIG. 1, a side view of spool assembly 20 in which jumper spool 22 is in a telescoped layout is shown. In FIG. 2, jumper spool 22 has a width 34 which is larger than width 32 of the non-telescoped layout shown in FIG. 1. As such, jumper spool 22 has a larger jumper storage capacity with width 34 than with width 32. In the telescoped layout, the multiple body layers of the cylindrical body structure of jumper spool 22 have expanded out from one another in order to increase the width of the jumper spool to maximum width 34. In the telescoped layout, jumper spool 22 maintains its diameter 30 to ensure that the minimum bend radius for jumpers 28 wrapped around or over the jumper spool is maintained.

The telescoping feature of jumper spool 22 enables the width of the jumper spool to be set between minimum width 32 and maximum width 34. This allows customization of the jumper storage capacity provided by jumper spool 22. The telescoping feature is triggered with the use of a spring button 36 positioned on top face 26. Spring button 36 is generally configured with bottom mount 24 and top face 26 to change the lateral position of the top face from left to right with respect to bottom mount 24 as seen by comparing FIGS. 1 and 2. To this end, spring button 36 is attached to a spring 37 which extends through the interior of jumper spool 22. A bottom end of spring 37 mounts to bottom mount 24. A top end of spring 37 mounts to top face 26.

Spring 37 is biased to push away from bottom mount 24 and apply a pushing out force to top face 26 in order to laterally move the top face away from the bottom mount and thereby increase the width of jumper spool 22. Top face 26 connects with the body layers of jumper spool 22 such that the body layers expand out from one another to increase the width of the jumper spool as the top face laterally moves away from bottom mount 24. Spring button 36 is configured with bottom mount 24, top face 26, and spring 37 to lock the spring in place in order to set the top face in a given lateral position with respect to the bottom face. Upon spring button 36 locking spring 37 in place, top face 26 is not able to laterally move farther away from bottom mount 24. Likewise, top face 26 is biased by spring 37 to maintain its given lateral position upon spring button 36 locking the spring in place.

Figure 3:
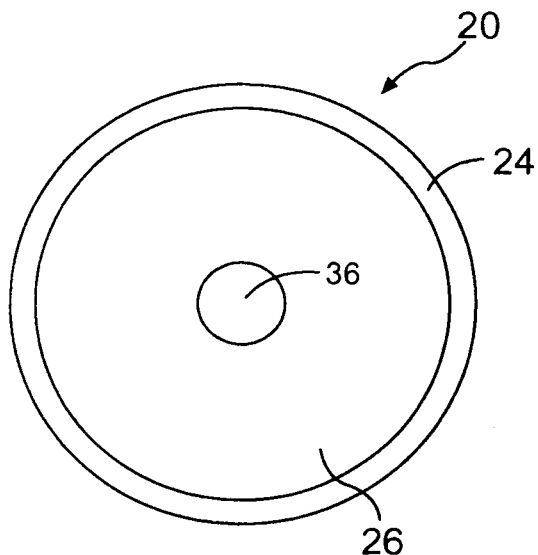
FIGS. 3 and 4 respectively illustrate top and bottom views of the spool assembly shown in FIG. 1.

Referring now to FIG. 3, with continual reference to FIGS. 1 and 2, a top view of spool assembly 20 is shown. As shown in FIG. 3, spring button 36 is generally positioned in the middle of the cylindrical body structure of top face 26. Likewise, the spring extends through the middle of the interior of jumper spool 22 between bottom mount 24 and top face 26.

Figure 4:
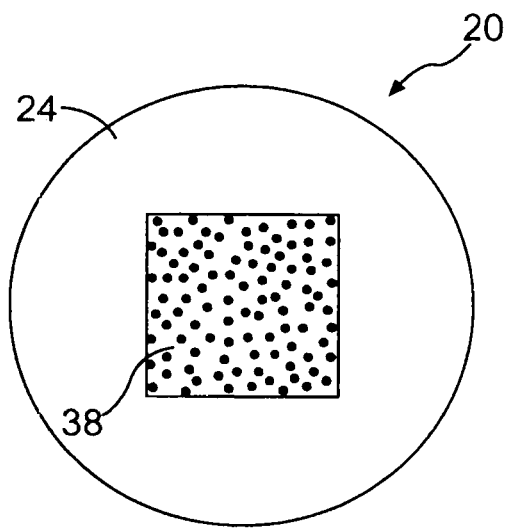

Referring now to FIG. 4, with continual reference to FIGS. 1 through 3, a bottom view of spool assembly 20 is shown. In accordance with the present invention, bottom mount 24 includes an adhesive surface 38. Adhesive surface 38 is a stick-on surface which is initially covered by a peel-off surface. Upon the peel-off surface being peeled off, adhesive surface 38 adheres to the surfaces of structures such as troughs, network equipment, fiber distribution frames, relay racks, etc. As such, adhesive surface 38 attaches spool assembly 20 to such surfaces. That is, wherever spool assembly 20 fits on a surface structure, the spool assembly can be attached and used. This enables customized placement of one or more spool assemblies 20 in a fiber optics environment.

Figure 5:
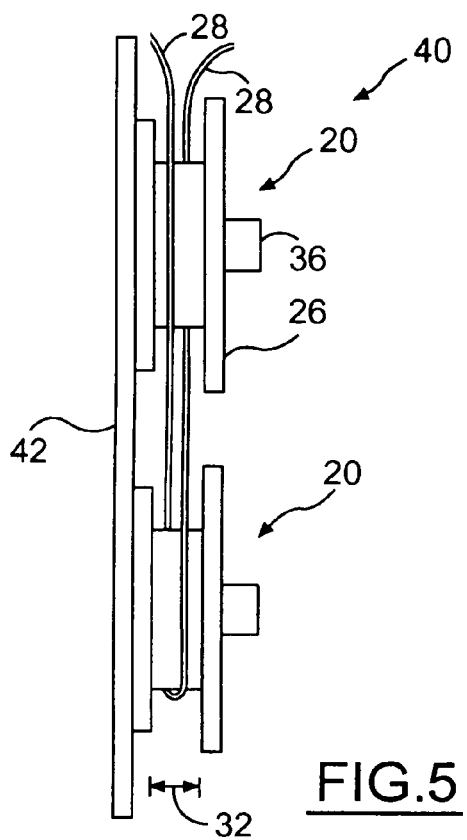
FIG. 5 illustrates a side view of a multiple spool assembly arrangement having jumper spools for absorbing fiber optic jumper slack in accordance with an embodiment of the present invention in which the jumper spools are in a non-telescoped layout.

Referring now to FIG. 5, with continual reference to FIGS. 1 through 4, a side view of a multiple spool assembly arrangement 40 in accordance with an embodiment of the present invention is shown. Multiple spool assembly arrangement 40 generally includes two or more jumper spools 22 for absorbing fiber optic jumper slack.

Adhesive surfaces 38 of bottom mounts 24 of jumper spools 22 adhere to a base plate 42 in order to mount the jumper spools onto the base plate. Jumper spools 22 are separated from one another by a minimum separation distance 44 (shown in FIG. 7) such as 3.0 inches. As such, jumper spools 22 rapidly absorb slack of jumpers by enabling the jumpers to wrap around the jumper spools 22 from one to another in a "figure eight" configuration. Again, the jumper storage volume capacity provided by jumper spools 22 of multiple spool assembly arrangement 40 is a function of the widths of the jumper spools. FIG. 5 illustrates jumper spools 22 in a non-telescoped layout such that the jumper spools have minimum width 32 and, consequently, have a minimum jumper volume storage capacity.

Figure 6:
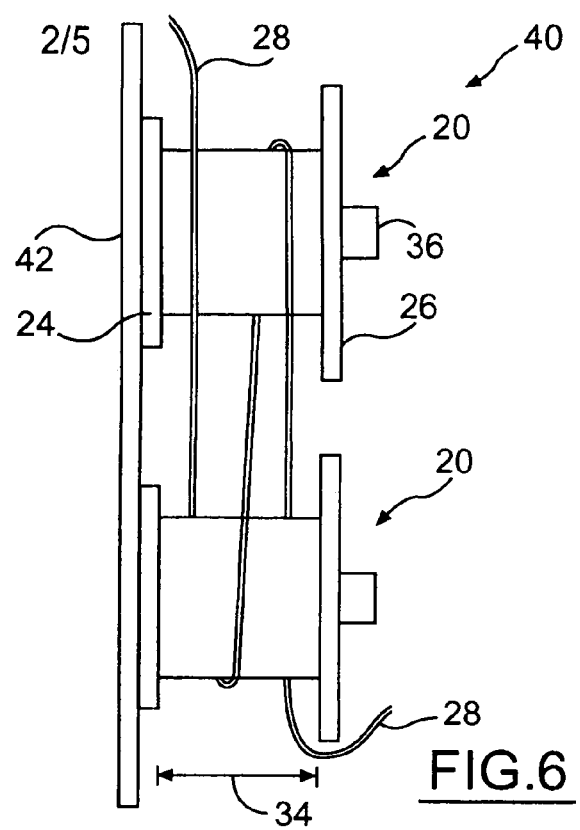
FIG. 6 illustrates a side view of the multiple spool assembly arrangement shown in FIG. 5 in which the jumper spools are in a telescoped layout.

Referring now to FIG. 6, with continual reference to FIGS. 1 through 5, a side view of multiple spool assembly arrangement 40 in which jumper spools 22 are in a telescoped layout is shown. In the telescoped layout shown in FIG. 6, jumper spools 22 have maximum width 34 and, consequently, have a maximum jumper volume storage capacity.

Figure 7:
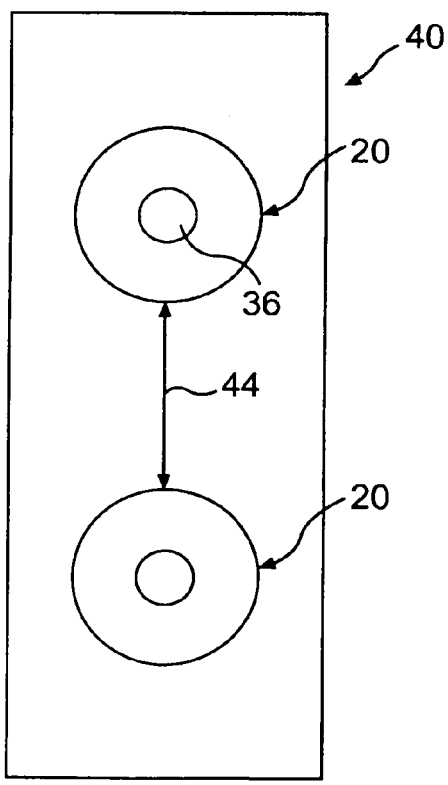
FIGS. 7 and 8 respectively illustrate top and bottom views of the multiple spool assembly arrangement shown in FIG. 5.

Referring now to FIG. 7, with continual reference to FIGS. 1 through 6, a top view of multiple spool assembly arrangement 40 is shown. As shown in FIG. 7, top faces 26 of jumper spools 22 are positioned away from one another by minimal separation distance 44. As described above, minimal separation distance 44 is set to ensure that jumpers 28 maintain their minimum bend radius when extending between jumper spools 28 in order to wrap around the jumper spools in the figure eight configuration.

Figure 8:
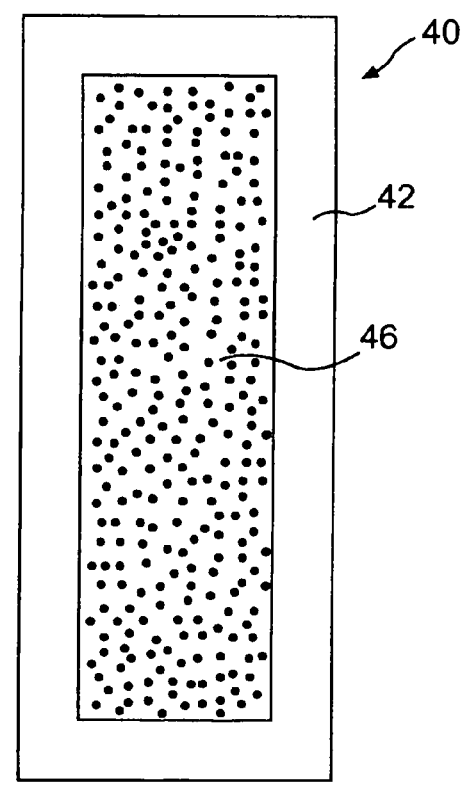

Referring now to FIG. 8, with continual reference to FIGS. 1 through 7, a bottom view of multiple spool assembly arrangement 40 is shown. In accordance with the present invention, base plate 42 includes an adhesive surface 46 like adhesive surfaces 38 of bottom mounts 24 of jumper spools 22. Adhesive surface 46 is a stick-on surface which adheres to the surfaces of structures such as troughs, network equipment, fiber distribution frames, relay racks, etc. As such, adhesive surface 46 attaches multiple spool assembly arrangement 40 to such surfaces. That is, wherever multiple spool assembly arrangement 40 fits on a surface structure, the multiple spool assembly arrangement can be attached and used. Again, this enables customized placement of multiple spool assembly arrangement 40 in a fiber optics environment.

Figure 9:
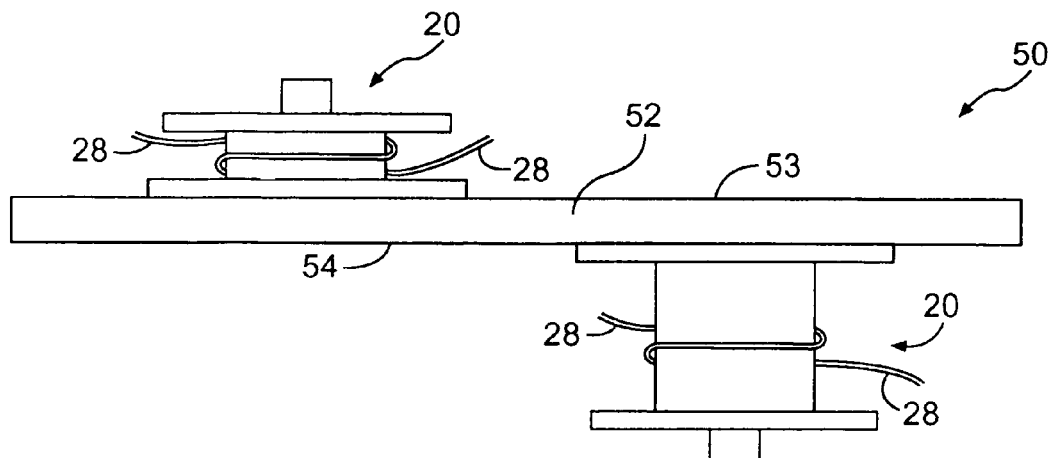
FIG. 9 illustrates a side view of a rack panel assembly having multiple jumper spools for absorbing fiber optic jumper slack in accordance with an embodiment of the present invention.

Referring now to FIG. 9, with continual reference to FIGS. 1 through 8, a side view of a relay rack panel assembly 50 in accordance with an embodiment of the present invention is shown. Rack panel assembly 50 includes a panel 52. Panel 52 is suitable for being horizontally inserted into a relay rack in a manner similar to how network equipment bays are inserted into the relay rack. Panel 52 includes a top surface 53 and a bottom surface 54. One or more jumper spools 22 are mounted on top surface 53 and/or bottom surface 54 of panel 52 for absorbing fiber optic jumper slack in a relay rack. When rack panel assembly 50 is inserted into a relay rack, jumper spools 22 absorb the slack of jumpers 28 routed between the network equipment bays in the relay rack. That is, jumpers 28 connected to one termination point in a network equipment bay are wrapped around or over jumper spools 22 and then connected to another termination point in the bay or in a different bay in order for the jumper spools to absorb the slack of the jumpers.

Figure 10:
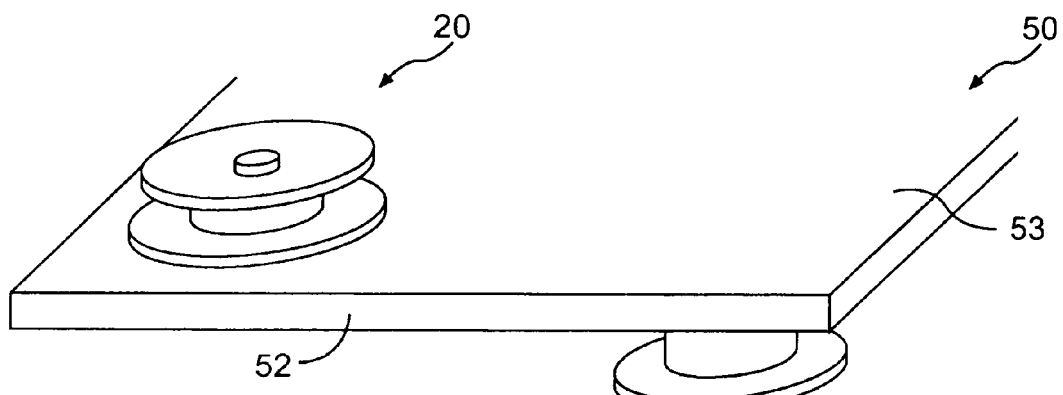
FIGS. 10 and 11 respectively illustrate top and bottom views of the rack panel assembly shown in FIG. 9.
Figure 11:
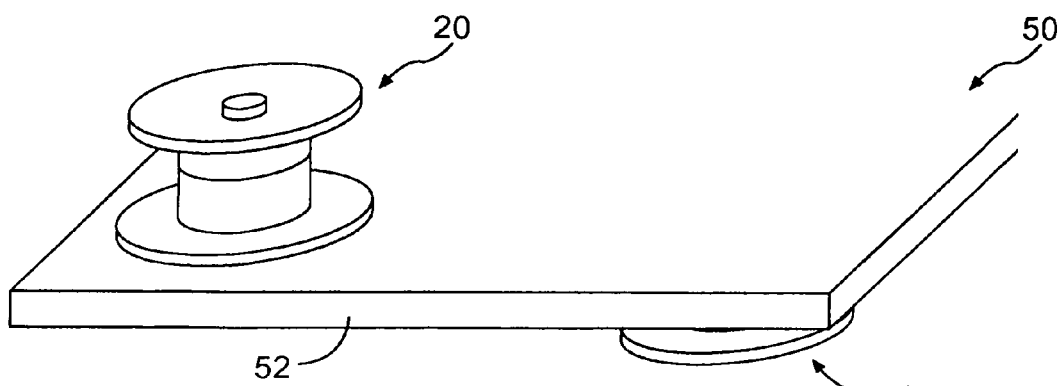

FIGS. 10 and 11 respectively illustrate top and bottom views of rack panel assembly 50. In particular, FIG. 10 illustrates top surface 53 of panel 52 more clearly. Similarly, FIG. 11 illustrates bottom surface 54 of panel 52 more clearly.

Figure 12:
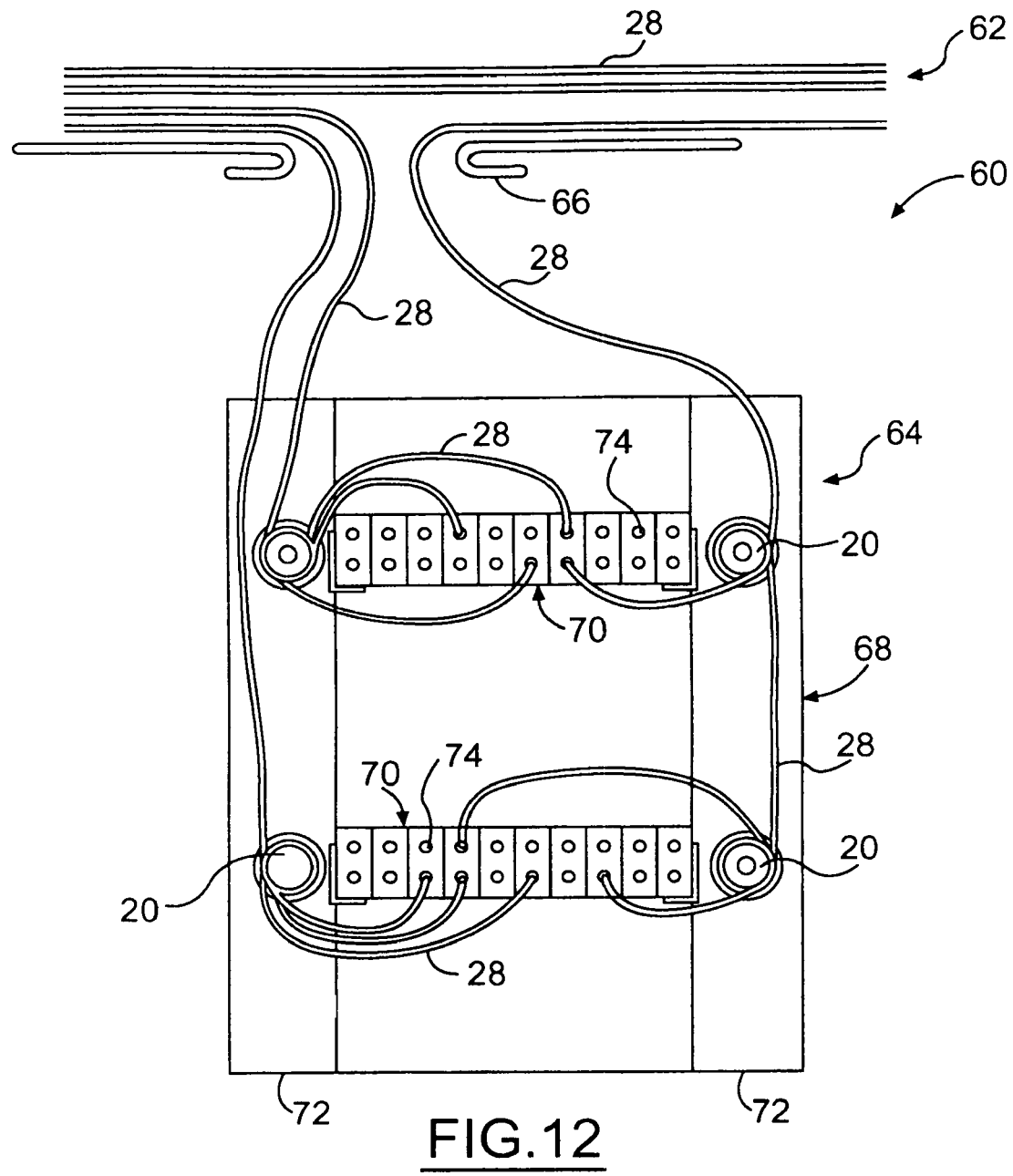
FIG. 12 illustrates a perspective view of a fiber optics environment having a raceway and network equipment in which spool assemblies having jumper spools in accordance with the present invention are selectively incorporated as part of the environment for absorbing fiber optic jumper slack.

Referring now to FIG. 12, with continual reference to FIGS. 1 through 11, a perspective view of a fiber optics environment 60 in accordance with the present invention is shown. Fiber optics environment 60 includes a raceway 62 horizontally extending over network equipment 64. Raceway 62 carries and supports jumpers 28 over network equipment 64. Certain jumpers 28 in raceway 62 exit the raceway through a raceway exit trough 66 to connect with network equipment 64. Network equipment 64 includes a relay rack 68 and a plurality of network equipment bays 70. Bays 70 are inserted into relay rack 68 and are mounted to sides 72 of the relay rack. Bays 70 include a plurality of fiber optic termination points 74 along with fiber optics communications equipment.

Jumpers 28 exited from raceway 62 extend down from the raceway and towards relay rack 68. Typically, these jumpers 28 run down along relay rack sides 72. Of course, these jumpers 28 are also able to run down along a duct within the interior of relay rack 68. In either event, these jumpers 28 route through network equipment 64 in order to make connections with network equipment bay termination points 74.

As can be appreciated, jumpers 28 routed in raceway 62 have a relatively large length as the jumpers are routed by the raceway through fiber optics environment 60. As such, the portions of jumpers 28 exited from raceway 62 will have a much larger length than the length required for making connections with network equipment bay termination points 74 placed below the raceway. Thus, this excess jumper length (i.e., slack) has to be stored within network equipment 64 in some manner.

In accordance with the present invention, fiber optics environment 60 includes spool assemblies 20 which are selectively incorporated as part of the environment for absorbing the jumper slack. In particular, spool assemblies 20 adhere to relay rack sides 72 in order to be selectively placed adjacent to bays 70. Jumpers 28 exited from raceway 62 extend down along relay rack sides 72 and wrap around or over spool assemblies 20. Jumpers 28 then extend from spool assemblies 20 to bays 70 in order to connect with termination points 74. As can be understood, spool assemblies 20 absorb the jumper slack as jumpers 28 wrap around or over the spool assemblies. Then, relatively small length portions of jumpers 28 extend from spool assemblies 20 to connect with termination points 74. Thus, the lengths of the portions of jumpers 28 running down through relay rack 68 and to termination points 74 are sized appropriately to the physical lengths actually required for these tasks whereas the lengths of the remaining jumper portions are stored by spool assemblies 20. As such, fiber optics environment 60 represents an environment in which jumper slack is stored next to network equipment 64 or within a fiber distributing frame.

Figure 13:
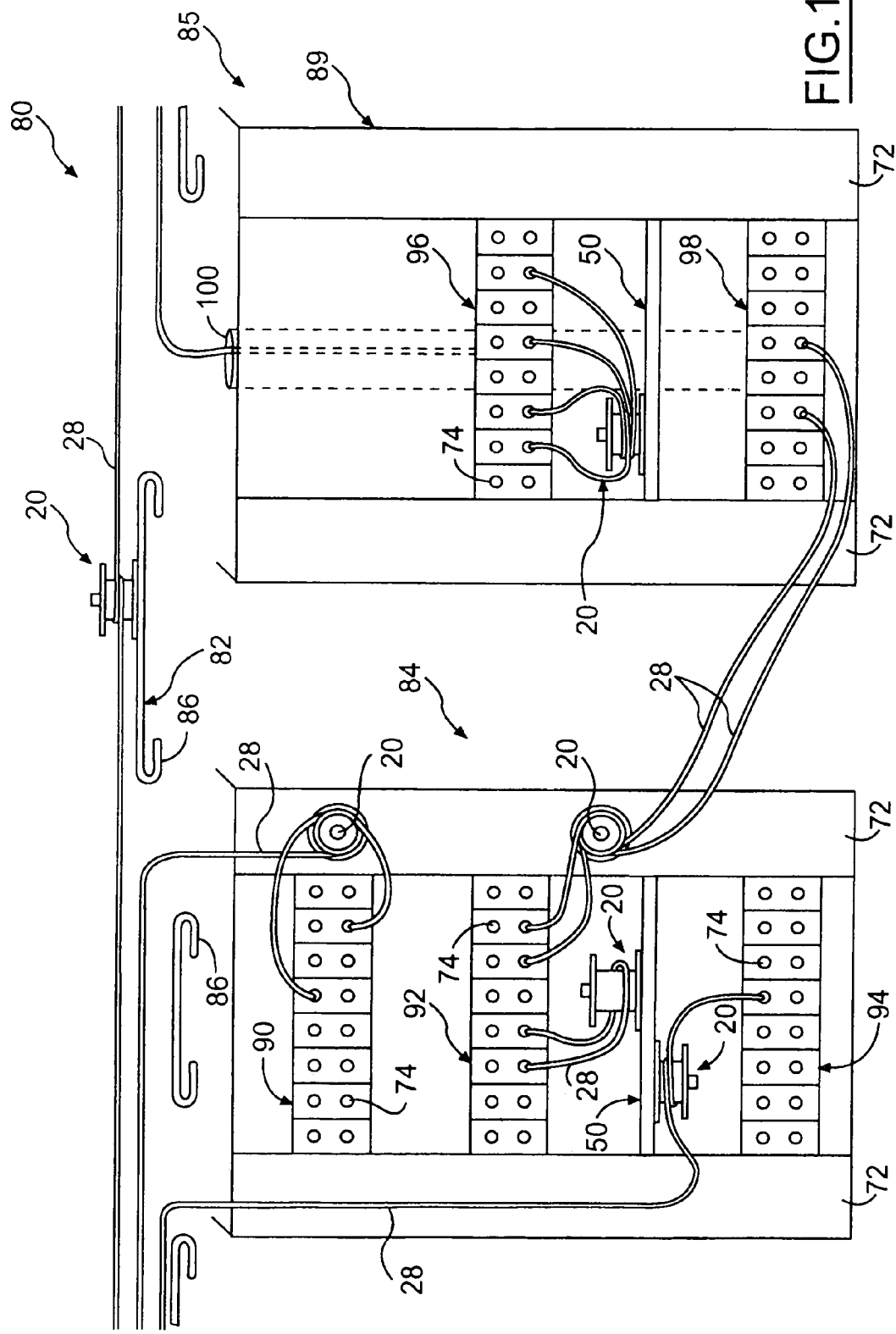
FIG. 13 illustrates a perspective view of another fiber optics environment having a raceway and network equipment in which spool assemblies and rack panel assemblies in accordance with the present invention are selectively incorporated as part of this environment for absorbing fiber optic jumper slack.

Referring now to FIG. 13, with continual reference to FIGS. 1 through 12, a perspective view of a fiber optics environment 80 in accordance with the present invention is shown. Fiber optics environment 80 also includes a raceway 82 extending over two pieces of network equipment 84, 85. Raceway 82 routes jumpers 28 over network equipment 84, 85. Jumpers 28 exit raceway 82 through exit raceway troughs 86 to connect with network equipment 84, 85.

Network equipment 84 includes a relay rack 88 and a plurality of network equipment bays 90, 92, 94. Bays 90, 92, 94 are inserted into relay rack 88 and are mounted to sides 72 of the relay rack. Bays 90, 92, 94 include a plurality of fiber optic termination points 74 along with fiber optics communications equipment. Similarly, network equipment 85 includes a relay rack 89 and a plurality of network equipment bays 96, 98. Bays 96, 98 are inserted into relay rack 89 and are mounted to sides 72 of the relay rack. Bays 96, 98 include a plurality of fiber optic termination points 74 along with fiber optics communications equipment.

Certain jumpers 28 exited from raceway 82 extend down from the raceway and towards relay rack 88 of network equipment 84. Such jumpers 28 run down along relay rack sides 72. Other jumpers 28 exited from raceway 82 extend down from the raceway and towards relay rack 89 of network equipment 85. These jumpers 28 run along a duct 100 within the interior of relay rack 89. In either event, jumpers 28 route through network equipment 84, 85 in order to make connections with network equipment bay termination points 74.

In accordance with the present invention, fiber optics environment 80 includes spool assemblies 20 and rack panel assemblies 50 which are selectively incorporated as part of the environment for absorbing jumper slack. For example, spool assemblies 20 are adhered to sides 72 of relay rack 88 in order to be selectively placed adjacent to bays 90, 92, 94 of network equipment 84. Jumpers 28 extend down along rack sides 72 and wrap around or over spool assemblies 20. Jumpers 28 then extend from spool assemblies 20 to connect with termination points 74 of network equipment bays 90, 92, 94.

Further, rack panel assemblies 50 are inserted into relay racks 88, 89 in a manner similar to how the bays are inserted and mounted in the relay racks. Rack panel assemblies 50 include spool assemblies 20 which are used to absorb jumper slack. For example, a spool assembly 20 of a panel assembly 50 mounted in relay rack 88 absorbs slack of jumpers 28 interconnected between network equipment bay 92 as shown in FIG. 13. Another spool assembly 20 of panel assembly 50 mounted in relay rack 88 absorbs slack of jumpers 28 which run along rack sides 72 and are interconnected between raceway 82 and network equipment bay 94 as shown in FIG. 13.

Likewise, for example, a spool assembly 20 of a panel assembly 50 mounted in relay rack 89 absorbs slack of jumpers 28 interconnected between network equipment bay 96 as shown in FIG. 13. This spools assembly 20 also absorbs slack of jumpers 28 which run along through duct 100 and are interconnected between raceway 82 and network equipment bay 96 as shown in FIG. 13. Further, for example, a spool assembly 20 adhered to rack side 72 of relay rack 88 absorbs slack of jumpers 28 routed and interconnected from network equipment 84 to network equipment bay 98 of network equipment 85 as shown in FIG. 13. As another example, a spool assembly 10 adhered to the inside surface of raceway 82 absorbs slack of jumpers 28 routed through the raceway as shown in FIG. 13.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A spool assembly for storing slack of fiber optic jumpers, the spool assembly comprising:
    a face;
    a mount having an adhesive surface; and
    a cylindrical spool supported between the face and the mount for receiving fiber optic jumpers wrapped over or around the spool in order to store slack of the fiber optic jumpers, the spool having a radius larger than a minimum bend radius of the fiber optic jumpers such that the fiber optic jumpers wrapped over or around the spool are not bent beyond the minimum bend radius;
    wherein the spool has a width between the face and the mount, wherein capacity of the spool for storing fiber optic jumpers is a function of the width of the spool, wherein the width of the spool is expandable in order to increase the capacity of the spool for storing fiber optic jumpers;
    wherein the adhesive surface of the mount is attachable to a structure in order to position the spool adjacent to the structure.

2. The spool assembly of claim 1 wherein:
the width of the spool is contractible in order to decrease the capacity of the spool for storing fiber optic jumpers.

3. The spool assembly of claim 2 further comprising:
a spring extending through the interior of the spool between the mount and the face;
a spring button on the face;
the spring button being operable with the mount, the face, and the spring to set a position of the spring in order to expand and contract the width of the spool.

4. The spool assembly of claim 1 further comprising:
a panel having a top surface and a bottom surface, the bottom surface having an adhesive surface;
wherein the adhesive surface of the mount attaches to the top surface of the panel in order to attach the spool to the panel;
wherein the adhesive surface of the bottom surface of the panel is attachable to a structure in order to position the spool adjacent to the structure.

5. The spool assembly of claim 4 further comprising:
a second cylindrical spool supported between a second face and a second mount for receiving fiber optic jumpers wrapped over or around the second spool in order to store slack of the fiber optic jumpers, the second spool having a radius larger than a minimum bend radius of the fiber optic jumpers such that the fiber optic jumpers wrapped over or around the second spool are not bent beyond the minimum bend radius;
wherein an adhesive surface of the second mount attaches to the top surface of the panel in order to attach the second spool to the panel;
wherein the adhesive surface of the bottom surface of the panel is attachable to the structure in order to position the second spool adjacent to the structure.

6. The spool assembly of claim 5 wherein:
the spools are attached to the top surface of the panel such that the spools have a minimum separation distance in order to accommodate the minimum bend radius of the fiber optic jumpers when the fiber optic jumpers are wrapped around the spools from one spool to the other spool in a figure eight configuration.

7. A fiber optics system comprising:
a relay rack having one or more network equipment bays horizontally inserted therein; and
a rack panel assembly having a panel suitable for being horizontally inserted into the relay rack between or adjacent to the network equipment bays, the panel having a top surface and a bottom surface;
the rack panel assembly further including one or more spool assemblies, each spool assembly including a cylindrical spool supported on a mount having an adhesive surface, the adhesive surface of the mount of a spool attaches to one of the top and bottom surfaces of the panel in order to attach the spool to the panel such that the spool is positioned between or adjacent to the network equipment bays in order to store slack of fiber optic jumpers connected to the network equipment bays upon the fiber optic jumpers being wrapped over or around the spool, the spool having a radius larger than a minimum bend radius of the fiber optic jumpers such that the fiber optic jumpers wrapped over or around the spool are not bent beyond the minimum bend radius;
wherein the spool is supported between the mount and a face, wherein the spool has a width between the face and the mount, wherein capacity of the spool for storing fiber optic jumpers is a function of the width of the spool;
wherein the width of the spool is expandable in order to increase the capacity of the spool for storing fiber optic jumpers, and the width of the spool is contractible in order to decrease the capacity of the spool for storing fiber optic jumpers.

8. The system of claim 7 wherein:
a spring extends through the interior of the spool between the mount and the face, and a spring button is on the face, wherein the spring button is operable with the mount, the face, and the spring to set a position of the spring in order to expand and contract the width of the spool.

9. The system of claim 7 further comprising:
a second set of spool assemblies, wherein the adhesive surface of the mount of a spool of the second set of spool assemblies attaches to a side of the relay rack in order to attach the spool of the second set of spool assemblies to the relay rack side such that the spool of the second set of spool assemblies is positioned adjacent to the network equipment bays in order to store slack of fiber optic jumpers connected to the network equipment bays upon the fiber optic jumpers being wrapped over or around the spool of the second set of spool assemblies.

10. The system of claim 7 further comprising:
a raceway extending over the relay rack, the raceway routing fiber optic jumpers to the network equipment bays in the relay rack; and
a second set of spool assemblies, wherein the adhesive surface of the mount of a spool of the second set of spool assemblies attaches to a side of the relay rack in order to attach the spool of the second set of spool assemblies to the relay rack side such that the spool of the second set of spool assemblies is positioned adjacent to the network equipment bays in order to store slack of fiber optic jumpers routed from the raceway to the network equipment bays upon these fiber optic jumpers being wrapped over or around the spool of the second set of spool assemblies.

11. The system of claim 7 further comprising:
a second relay rack having one or more network equipment bays horizontally inserted therein; and
a second set of spool assemblies, wherein the adhesive surface of the mount of a spool of the second set of spool assemblies attaches to a side of the second relay rack in order to attach the spool of the second set of spool assemblies to the second relay rack side such that the spool of the second set of spool assemblies is positioned to store slack of fiber optic jumpers routed between the relay racks upon these fiber optic jumpers being wrapped over or around the spool of the second set of spool assemblies.

12. A fiber optics system comprising:
a rack having one or more network equipment bays inserted therein;
a raceway extending over the rack, the raceway routing fiber optic jumpers to the network equipment bays in the rack; and
a spool assembly including a cylindrical spool supported on a mount having an adhesive surface, the adhesive surface of the mount of the spool attaches to the rack in order to attach the spool to the rack such that the spool is positioned adjacent to the network equipment bays in order to store slack of fiber optic jumpers connected between the raceway and the network equipment bays upon the fiber optic jumpers being wrapped over or around the spool, the spool having a radius larger than a minimum bend radius of the fiber optic jumpers such that the fiber optic jumpers wrapped over or around the spool are not bent beyond the minimum bend radius;

wherein the spool is supported between the mount and a face, wherein the spool has a width between the face and the mount, wherein capacity of the spool for storing fiber optic jumpers is a function of the width of the spool;

wherein the width of the spool is expandible in order to increase the capacity of the spool for storing fiber optic jumpers.

13. The system of claim 12 wherein:

the width of the spool is contractible in order to decrease the capacity of the spool for storing fiber optic jumpers.

14. The system of claim 13 wherein:

a spring extends through the interior of the spool between the mount and the face, and a spring button is on the face, wherein the spring button is operable with the mount, the face, and the spring to set a position of the spring in order to expand and contract the width of the spool.

* * * * *